United States Patent
Wang et al.

(10) Patent No.: US 11,637,680 B2
(45) Date of Patent: Apr. 25, 2023

(54) METHODS AND APPARATUSES FOR SIGNALLING A FREQUENCY OFFSET IN A NB-IOT TDD NETWORK

(71) Applicant: TELEFONAKTIEBOLAGET LM ERICSSON (PUBL), Stockholm (SE)

(72) Inventors: Yi-Pin Eric Wang, Fremont, CA (US); Gerardo Agni Medina Acosta, Märsta (SE); Johan Bergman, Stockholm (SE); Olof Liberg, Stockholm (SE); Kazuyoshi Uesaka, Kawasaki (JP); Yutao Sui, Solna (SE); Talha Khan, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 139 days.

(21) Appl. No.: 16/975,095

(22) PCT Filed: Feb. 25, 2019

(86) PCT No.: PCT/IB2019/051512
§ 371 (c)(1),
(2) Date: Aug. 21, 2020

(87) PCT Pub. No.: WO2019/162920
PCT Pub. Date: Aug. 29, 2019

(65) Prior Publication Data
US 2020/0396045 A1 Dec. 17, 2020

Related U.S. Application Data

(60) Provisional application No. 62/635,286, filed on Feb. 26, 2018.

(51) Int. Cl.
*H04W 4/00* (2018.01)
*H04L 5/00* (2006.01)
(Continued)

(52) U.S. Cl.
CPC .......... *H04L 5/0092* (2013.01); *H04L 5/1469* (2013.01); *H04L 27/2607* (2013.01);
(Continued)

(58) Field of Classification Search
None
See application file for complete search history.

(56) References Cited

U.S. PATENT DOCUMENTS 10,194,440 B2 * 1/2019 Gaal ................ H04L 5/001
10,863,460 B2 * 12/2020 Xue ................. H04W 4/70
(Continued)

FOREIGN PATENT DOCUMENTS

WO 2017123279 A1 7/2017

OTHER PUBLICATIONS

5G—Frame Structure; Aug. 21, 2017; 13 pages.
(Continued)

*Primary Examiner* — Bob A Phunkulh
(74) *Attorney, Agent, or Firm* — Ericsson Inc.

(57) ABSTRACT

Methods and apparatuses are disclosed for communicating to a wireless device (WD) a DL-to-UL frequency offset (or frequency shift) that may need to be applied. For example, a method implemented in a wireless device (WD) is provided. The method comprises: receiving, from the network node, an indication of a frequency offset; and applying the received frequency offset; wherein the WD is configured to operate on a narrow-band Internet of Things (NB-IoT) carrier in a New Radio (NR) carrier.

18 Claims, 8 Drawing Sheets

(51) Int. Cl.
  *H04W 4/80* (2018.01)
  *H04L 5/14* (2006.01)
  *H04L 27/26* (2006.01)
  *H04W 72/12* (2023.01)
  *H04W 72/04* (2023.01)
(52) U.S. Cl.
  CPC ........... *H04L 27/2646* (2013.01); *H04W 4/80* (2018.02); *H04W 72/0406* (2013.01); *H04W 72/1289* (2013.01)

(56) References Cited

U.S. PATENT DOCUMENTS

| | | | | |
|---|---|---|---|---|
| 11,528,725 | B1* | 12/2022 | Qureshi | H04W 28/26 |
| 11,528,769 | B2* | 12/2022 | Cheng | H04W 76/25 |
| 2017/0230780 | A1 | 8/2017 | Chincholi | |
| 2017/0251455 | A1 | 8/2017 | Shin et al. | |
| 2017/0265156 | A1* | 9/2017 | Xue | H04L 5/0053 |
| 2018/0006763 | A1* | 1/2018 | Kim | H04W 72/0413 |
| 2018/0063841 | A1* | 3/2018 | Song | H04W 48/06 |
| 2019/0053061 | A1* | 2/2019 | Sui | H04W 72/0446 |
| 2019/0116592 | A1* | 4/2019 | Moon | H04L 5/00 |
| 2019/0141705 | A1* | 5/2019 | Dalipi | H04W 72/0453 |
| 2019/0158241 | A1* | 5/2019 | Behravan | H04L 27/2646 |
| 2019/0349734 | A1* | 11/2019 | Sui | H04W 72/0453 |
| 2019/0349775 | A1* | 11/2019 | Sui | H04W 16/14 |
| 2021/0099944 | A1* | 4/2021 | Höglund | H04L 5/0005 |
| 2021/0289470 | A1* | 9/2021 | Kumar | H04L 5/0053 |
| 2022/0394758 | A1* | 12/2022 | Turtinen | H04W 74/0833 |

OTHER PUBLICATIONS

3GPP TSG-RAN WG1, Meeting No. 92bis; "UL aspects of TDD for NB-IoT"; Feb. 16-Apr. 20, 2018; 21 pages.
3GPP TSG RAN WG1, Meeting No. 92; "Discussion on UL channels for TDD NB-IoT"; Feb. 16-Mar. 2, 2018; 6 pages.
International Search Report and Written Opinion for PCT/IB2019/051512; dated Jun. 6, 2019; 16 pages.

\* cited by examiner

METHODS AND APPARATUSES FOR SIGNALLING A FREQUENCY OFFSET IN A NB-IOT TDD NETWORK

RELATED APPLICATIONS

The present application claims the benefits of priority of U.S. Provisional Patent Application No. 62/635,286, entitled "Methods of determining DL-to-UL frequency offset in a NB-IoT TDD network" and filed at the United States Patent and Trademark Office on Feb. 26, 2018, the content of which is incorporated herein by reference filed on.

FIELD

The present disclosure relates to wireless communications, and in particular, to determining Downlink to Uplink (DL-to-UL) Frequency Offset in a Narrow Band-Internet of Things Time Division Duplex (NB-IoT TDD) Network.

INTRODUCTION

In Release 13, Third Generation Partnership Project (3GPP) developed NB-IoT for deployment in Frequency Division Duplex (FDD) bands. This new radio access technology provides connectivity to services and applications demanding qualities such as reliable indoor coverage and high capacity in combination with low system complexity and optimized power consumption.

NB-IoT supports three mode of operations; stand-alone, in-band and guard-band. NB-IoT can be deployed in stand-alone operation mode using one refarmed Global System for Mobile (GSM) frequencies, or inside a Long Term Evolution (LTE) carrier using the in-band operation mode or guard-band operation mode. In Rel-15, NB-IoT is extended to support TDD bands.

Anchor Carrier

The minimum system bandwidth in NB-IoT is 200 kHz. In this basic setup a NB-IoT anchor carrier is transmitted in the cell. It supports basic cellular functionality such as synchronization, broadcast of system information, as well as paging and random access. For the stand-alone mode, the anchor carrier is deployed on 100 kHz frequency raster. In-band and guard-band modes allow a raster offset of +/−2.5 kHz or +/−7.5 kHz.

Raster Offset

Figure 1:
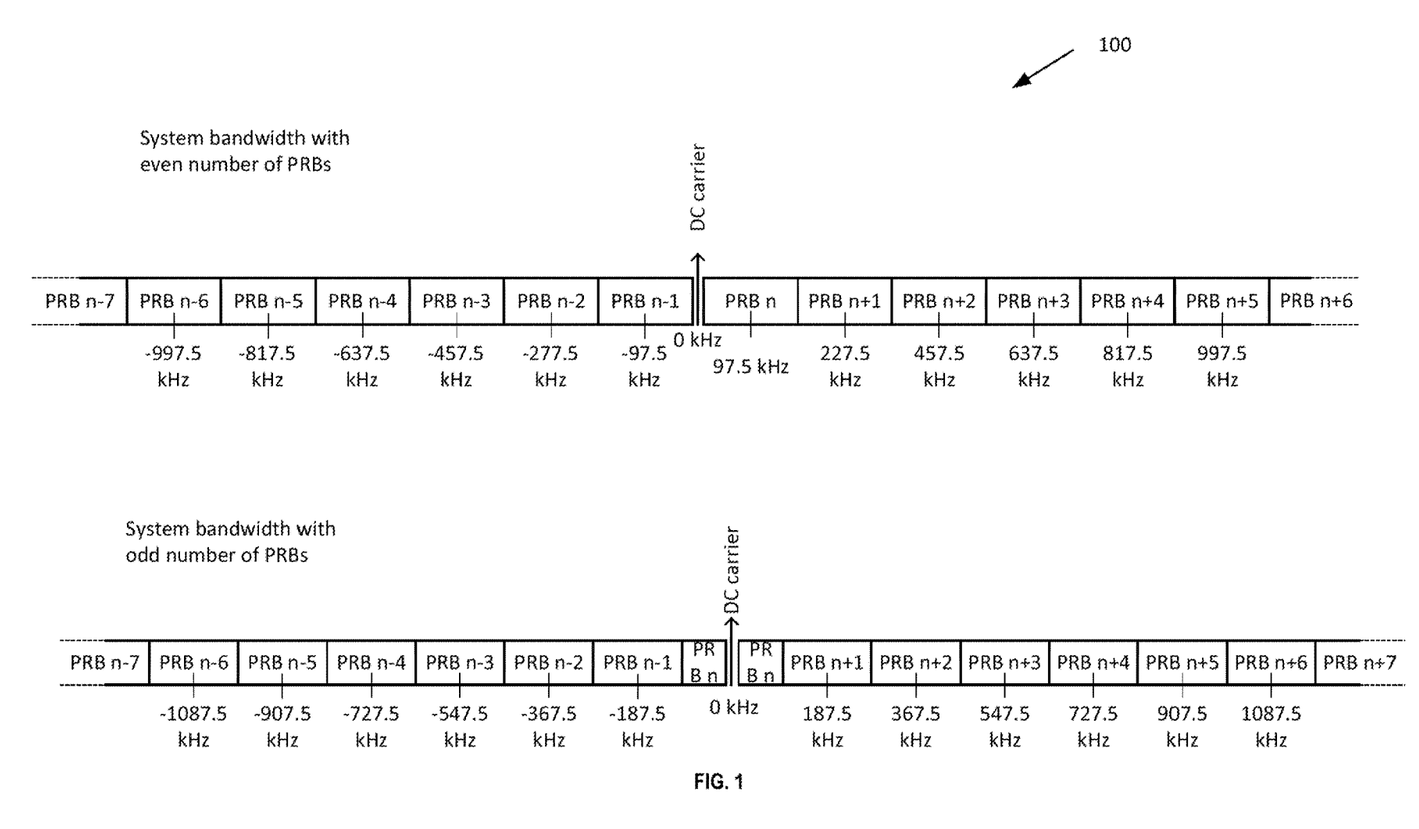
FIG. 1 is a schematic diagram of center frequency offset of LTE PRBs for carriers with even and odd number of PRBs according to principles in the present disclosure.

The channel raster of the downlink of NB-IoT systems is on a frequency grid of 100 kHz. A NB-IoT device tries to find the NB-IoT carriers in a step size of 100 kHz. For the standalone deployment, this is fine. But for the in-band and guard-band operation, due to the presence of the Direct Current (DC) subcarrier (located on 100 kHz raster grid) and the fact the center of the Physical Resource Block (PRB) is in between two sub-carriers, there is no PRB that falls directly on the NB-IoT cell search grid used in LTE in-band and guard-band operation. The frequency offset to the 100 kHz grid is a minimum of ±2.5 kHz and ±7.5 kHz for even and odd number of PRBs in the LTE system bandwidth, respectively. This is shown in FIG. 1. The ±2.5 kHz or ±7.5 kHz can be handled by the device during the cell search process and eventually the UE learns about the raster offset from Narrowband Master Information Block (MIB-NB). These offsets constrain the positions where NB-IoT carriers can be deployed for the in-band and guard-band operations. Therefore, for a NB-IoT DL carrier that contains synchronization signal and system information, it can only be put on a frequency that is near the 100 kHz grid point.

For the guard-band operation, for an LTE system with 10 or 20 MHz system bandwidth, it is possible to find NB-IoT downlink carrier frequency that is 2.5 kHz off the 100 kHz frequency raster. For other LTE system bandwidth, the offset to the 100 kHz raster is 52.5 kHz. Therefore, in order to get within the same ±7.5 kHz to the 100 kHz grid, 3 guard subcarriers are needed. One guard carrier is 15 kHz width and placed in the same subcarrier grid at the legacy LTE system that gives orthogonality to the legacy LTE PRB.

LTE Downlink to Uplink (DL-to-UL) Half-Tone Shift

Figure 2:
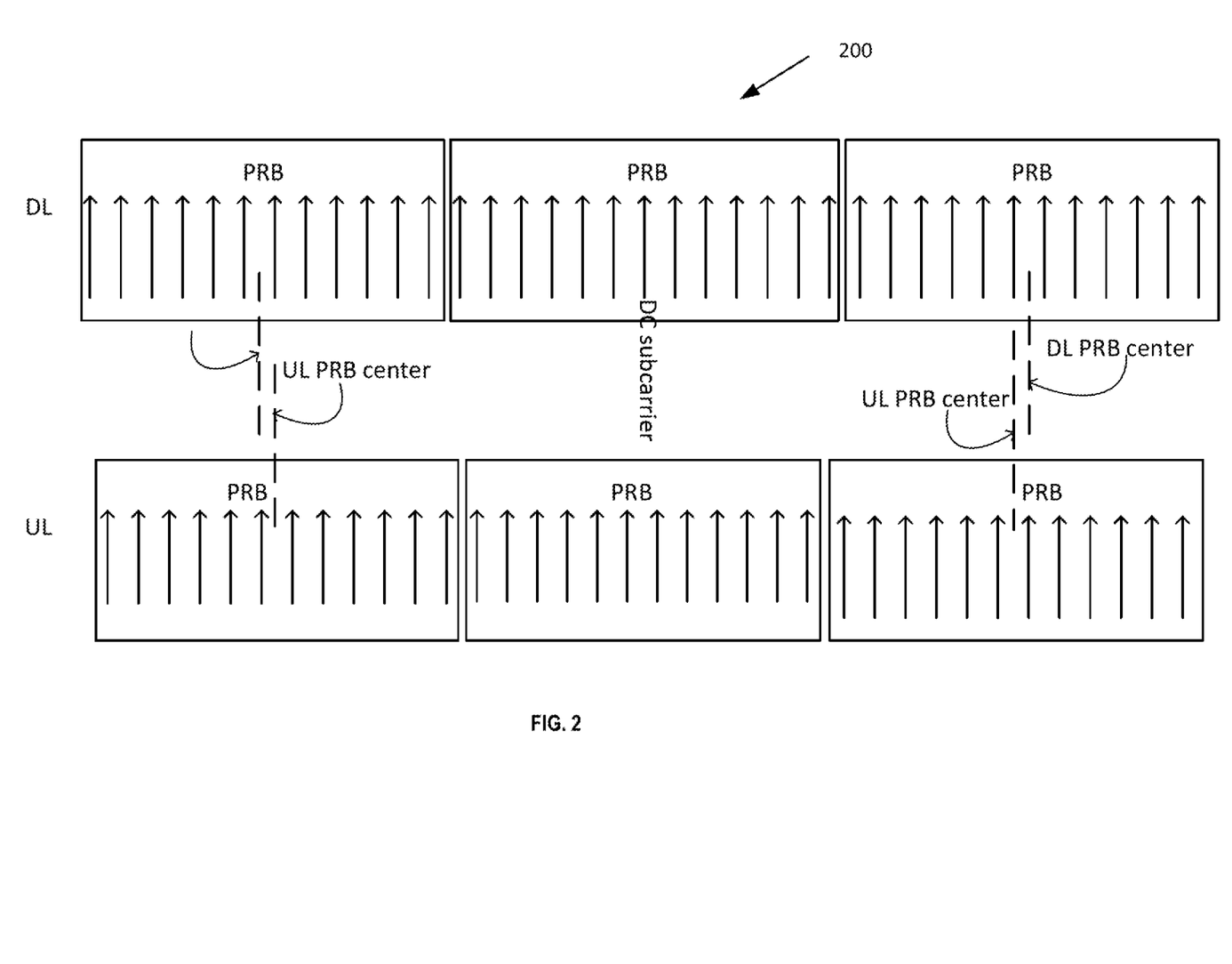
FIG. 2 is a schematic diagram of a half-tone shift between DL and UL PRB center according to some principles in the present disclosure.

In LTE uplink, there is no Direct Current (DC) subcarrier. For LTE TDD, this results in a half-tone shift (i.e. 7.5 kHz) between DL and UL carrier grids as illustrated in FIG. 2. Here an example where the middle LTE PRB contains the DC subcarrier in addition to the 12 useable subcarriers is used. This corresponds to LTE bandwidth of 3, 5, and 15 MHz. It can be seen that in this case, there is a half-tone shift between the DL and UL PRB centers. The shift of UL PRB center, relative to the DL PRB center is −7.5 kHz for PRBs above the DC subcarrier, and 7.5 kHz for the PRBs lower than the DC subcarrier.

For NB-IoT TDD operating within a LTE carrier using the in-band mode of operation, the UL PRB will, just as for LTE, be offset by ±7.5 kHz compared to the DL PRB.

NR (New Radio)

NR is a new radio access technology introduced in 3GPP Rel-15. NR includes 15 kHz subcarrier spacing, same as LTE. Thus, it is possible to migrate an LTE band to NR, while keeping NB-IoT inside an NR carrier. However, one difference between NR and LTE is that, NR does not have the DC subcarrier. This means that the half-tone shift between DL and UL in the LTE case does not occur in the NR case.

For NB-IoT in-band and guard-band operation, it is important that NB-IoT uses the same subcarrier grids as LTE. This means that, NB-IoT needs to apply the DL-to-UL frequency offset according to the difference in DL and UL PRB centers as illustrated in FIG. 2. It was proposed in R1-1801938 Discussion on UL channels for TDD NB-IoT, RAN1 #92, Samsung (publicly available via www.3gpp.org) that, this offset is signaled in System Information Block 2 (SIB2) when NB-IoT TDD is deployed inside an LTE carrier operating as in-band or guard-band operation mode.

Furthermore, the issues of NB-IoT TDD deployed inside an NR TDD carrier were not addressed in R1-1801938 Discussion on UL channels for TDD NB-IoT, RAN1 #92, Samsung.

SUMMARY

The signaling proposed in R1-1801938 appears redundant and/or inefficient. Some embodiments of the present disclosure provide methods and apparatuses through which an NB-IoT TDD device (or other wireless device) infers (or retrieves) such an offset from the raster offset signaled in MIB-NB. Some embodiments advantageously provide methods and apparatuses for determining DL-to-UL frequency offset in a NB-IoT TDD network. Some advantages of some embodiments of the present disclosure may include reducing signaling when NB-IoT TDD is deployed inside an LTE carrier using the in-band or guard-band operation mode. Some embodiments of the present disclosure also support NB-IoT TDD to be deployed inside an NR carrier.

For NB-IoT TDD operating in stand-alone mode, it is expected that 3GPP Release 15 can specify a 0 kHz offset between UL and DL PRBs.

For NB-IoT TDD operating in guard-band mode, the UL to DL offset may either follow the in-band definition, or the stand-alone definition. This will be specified as part of 3GPP Release 15.

In some embodiments of the present disclosure, methods and apparatuses for an NB-IoT TDD device to determine the DL-to-UL frequency shift are proposed. Additionally, in some embodiments of the present disclosure, methods and apparatuses for signaling to support NB-IoT TDD being deployed inside an NR carrier are proposed.

In one embodiment, a method implemented in a network node, is provided. The method comprises configuring a narrow-band-Internet of things (NB-IoT) carrier in a new radio (NR) carrier; and transmitting an indication of a frequency offset to be applied.

In one embodiment, a network node configured to communicate with a wireless device (WD) is provided. The network node is configured to perform the above method.

In some embodiments, a non-transitory computer-readable medium is provided. The non-transitory-readable medium storing a computer program product comprising instructions which, upon being executed by processing circuitry (e.g., at least one processor) of the network node, configure the processing circuitry to perform one or more functionalities of the network node as described herein.

In one embodiment, a method implemented in a wireless device (WD), is provided. The method comprises receiving, from the network node, an indication of a frequency shift; and applying the received frequency shift; wherein the WD is configured to operate on a narrow-band Internet of Things (NB-IoT) carrier in a New Radio (NR).

In one embodiment, a wireless device (WD) configured to communicate with a network node is provided. The WD is configured to perform the immediately above method.

In some embodiments, a non-transitory computer-readable medium is provided. The non-transitory-readable medium storing a computer program product comprising instructions which, upon being executed by processing circuitry (e.g., at least one processor) of the wireless device, configure the processing circuitry to perform one or more functionalities of the wireless device as described herein.

According to another embodiment, a host computer, comprising a communication module configured to at least one of observe, monitor, control, transmit, and receive information associated with any of the methods of embodiments described herein is provided.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to methods and apparatuses for determining DL-to-UL Frequency Offset in a NB-IoT TDD Network. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide methods and apparatuses for communicating to a WD 22 a raster offset indicative of a DL-to-UL frequency offset (or frequency shift) to be applied and/or system information message indicating whether a DL-to-UL frequency offset (or frequency shift) needs to be applied.

Figure 3:
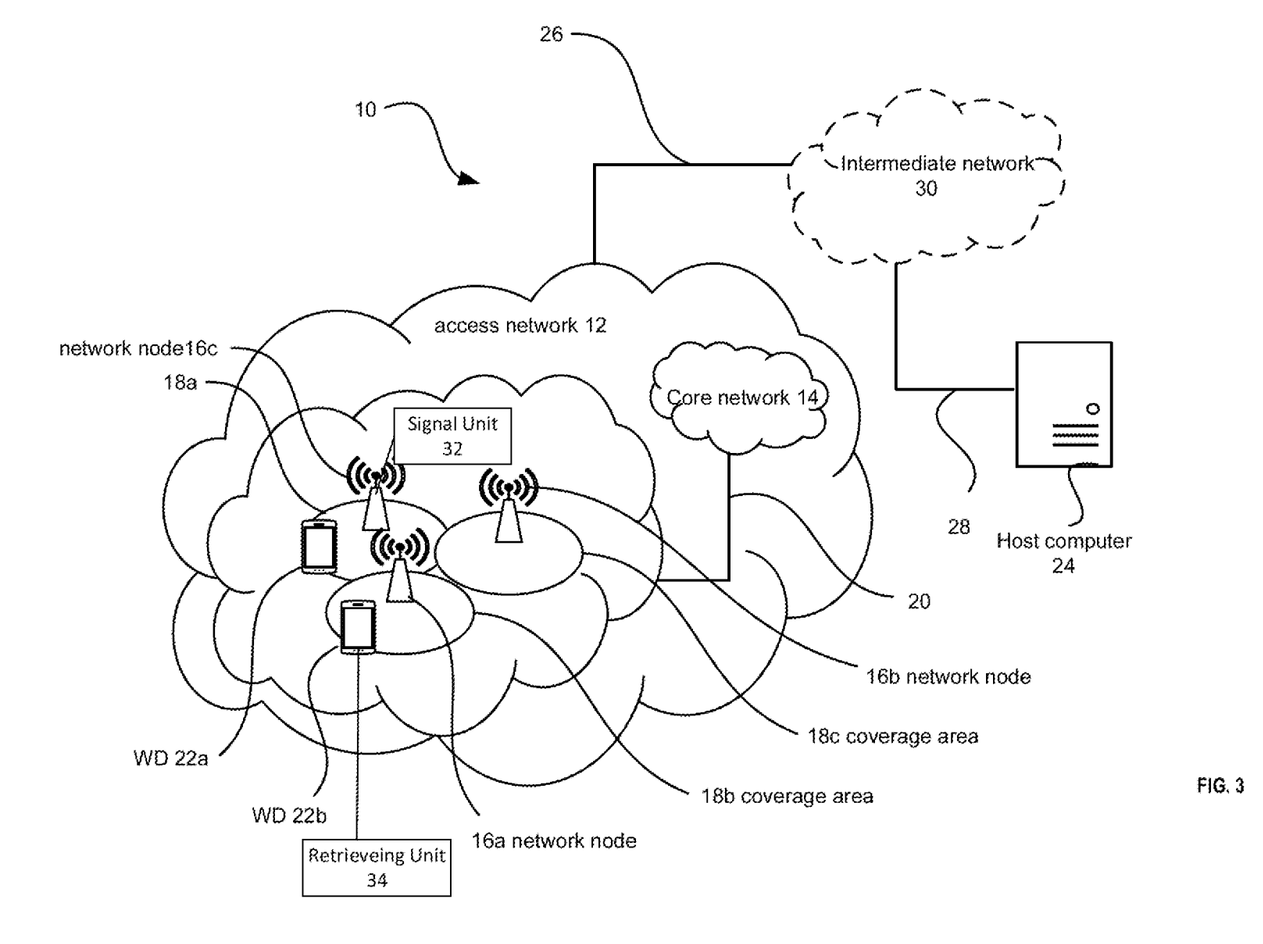
FIG. 3 is a schematic diagram of an exemplary network architecture illustrating a communication system connected via an intermediate network to a host computer according to some principles in the present disclosure.

Other embodiments provide methods and apparatuses for communicating to a WD 22 an indication of a DL-to-UL frequency offset (or frequency shift) to be applied by the WD 22, when it is operating on a NB-IoT carrier in a NR carrier. Returning to the drawing figures, in which like elements are referred to by like reference numerals, there is shown in FIG. 3 a schematic diagram of a communication system, according to an embodiment, including a communication system 10, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WS 22 can be in communication with an eNB—for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24. A network node 16 is configured to include a signal unit 32 which is configured to signal the WD 22 a raster offset indicative of a DL-to-UL frequency offset (or frequency shift) to be applied and/or system information message indicating whether a DL-to-UL frequency offset (or frequency shift) needs to be applied. The signal unit 32 can be also configured to send an indication of a frequency offset to a wireless device. A wireless device 22 is configured to include a retrieving unit 34 which is configured to receive, from the network node 16, a raster offset indicative of a DL-to-UL frequency offset (or frequency shift) to be applied and/or system information message indicating whether a DL-to-UL frequency offset (or frequency shift) needs to be applied. The retrieving unit 34 can be also configured to receive an indication of a frequency offset from the network node 16, when the wireless device is configured/determined to be operating on a NB-IoT carrier in a NR carrier.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor such, as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a communication unit 54 configured to enable the service provider to observe/monitor/control/transmit to/receive from the network node 16 and/or the wireless device 22 for performing any of the methods and techniques described herein.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor such, as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from)

the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include signal unit 32 configured to signal the WD 22 a raster offset indicative of a DL-to-UL frequency offset (or frequency shift) to be applied and/or system information message indicating whether a DL-to-UL frequency offset (or frequency shift) needs to be applied. The signal unit 32 may be further configured to send an indication of a frequency shift to the WD 22.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor such, as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a retrieving unit 34 configured to receive, from the network node 16, a raster offset indicative of a DL-to-UL frequency offset (or frequency shift) to be applied and/or system information message indicating whether a DL-to-UL frequency offset (or frequency shift) needs to be applied. The retrieving unit 34 may be configured to receive, from the network node 16, an indication of a frequency offset, when the WD 22 is configured to be operating on a NB-IoT carrier in a NR carrier.

Figure 4:
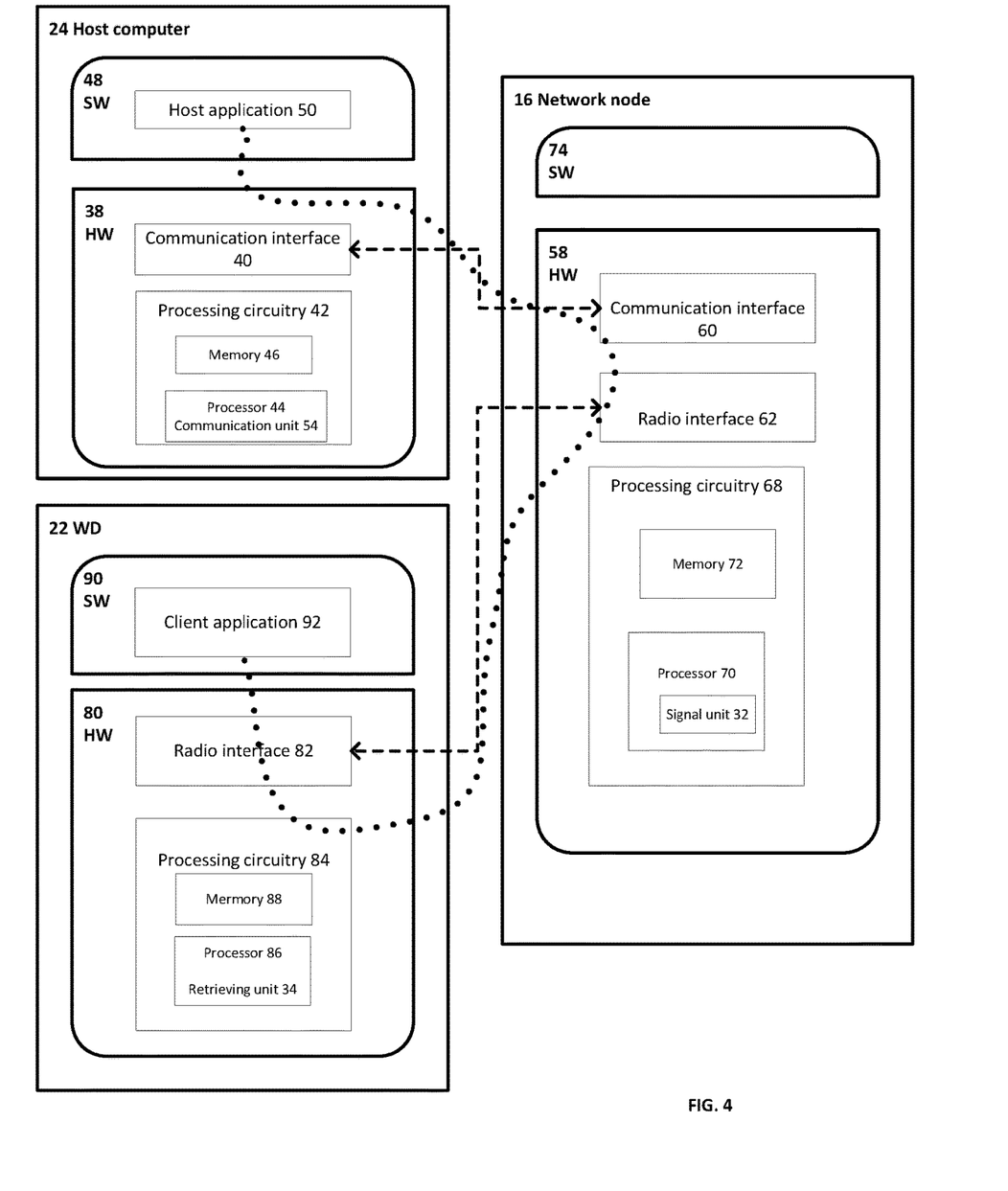
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as signal unit 32 and retrieving unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 7:
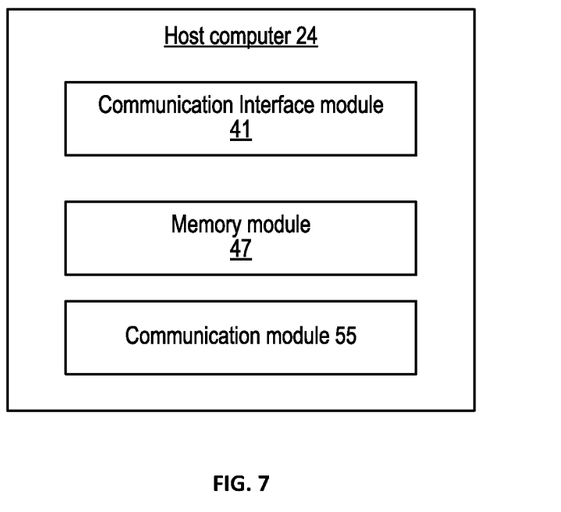
FIG. 7 is a block diagram of an alternative embodiment of a host computer according to some embodiments of the present disclosure.

FIG. 7 is a block diagram of an alternative host computer 24, which may be implemented at least in part by software modules containing software executable by a processor to perform the functions described herein. The host computer 24 include a communication interface module 41 configured to set up and maintain a wired or wireless connection with an interface of a different communication device of the communication system 10. The memory module 47 is configured to store data, programmatic software code and/or other information described herein. Communication module 55 is configured to enable the service provider to observe/monitor/control/transmit to/receive from the network node 16 and/or the wireless device 22 for performing any of the methods and techniques described herein.

Figure 5:
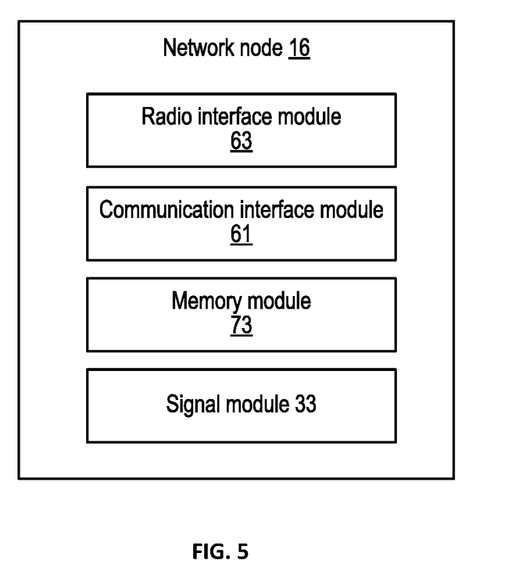
FIG. 5 is a block diagram of an alternative embodiment of a network node according to some embodiments of the present disclosure.

FIG. 5 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a WD 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The signal module 33 is configured to signal a WD 22 a raster offset indicative of a DL-to-UL frequency offset (or frequency shift) to be applied and/or system information message indicating whether a DL-to-UL frequency offset (or frequency shift) needs to be applied. The signal module 33 may be further configured to send an indication of a frequency shift to the WD 22.

Figure 6:
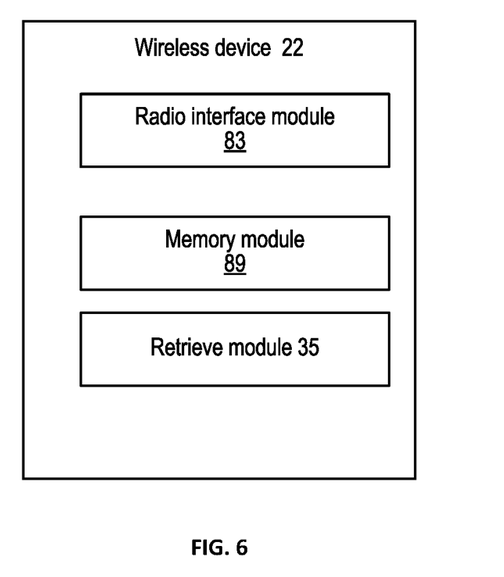
FIG. 6 is a block diagram of an alternative embodiment of a wireless device according to some embodiments of the present disclosure.

FIG. 6 is a block diagram of an alternative wireless device 22, which may be implemented at least in part by software modules containing software executable by a processor to perform the functions described herein. The WD 22 includes a radio interface module 83 configured to set up and maintain a wireless connection 64 with a network node 16 serving a coverage area 18 in which the WD 22 is currently located. The memory module 89 is configured to store data, programmatic software code and/or other information described herein. The retrieving module 35 is configured to receive from a network node, a raster offset indicative of a DL-to-UL frequency offset (or frequency shift) to be applied and/or system information message indicating whether a DL-to-UL frequency offset (or frequency shift) needs to be applied. The retrieving module 35 may be configured to receive, from the network node 16, an indication of a frequency offset, when the WD 22 is configured to be operating on a NB-IoT carrier in a NR carrier.

Figure 8:
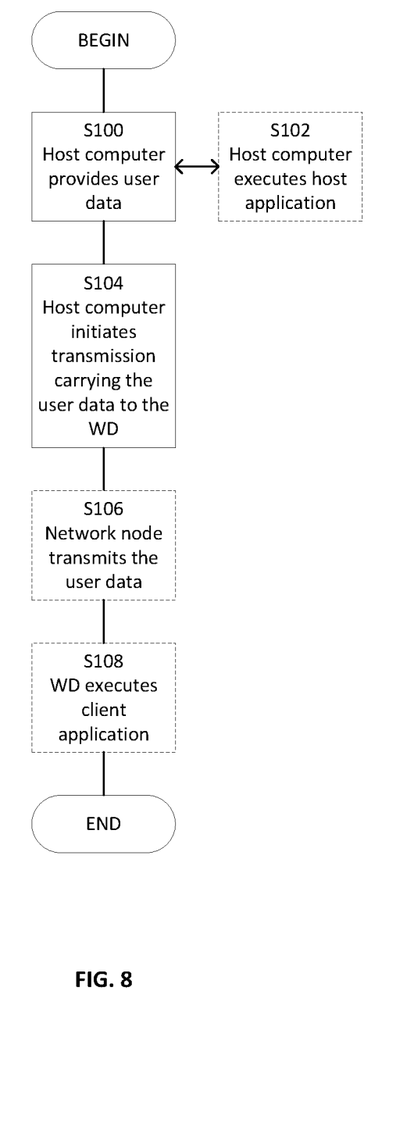
FIGS. 8-11 are flow charts illustrating exemplary methods implemented in a communication system including a host computer, a network node and a wireless device according to some embodiments of the present disclosure.

FIG. 8 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 74 executed by the host computer 24 (block S108).

Figure 9:
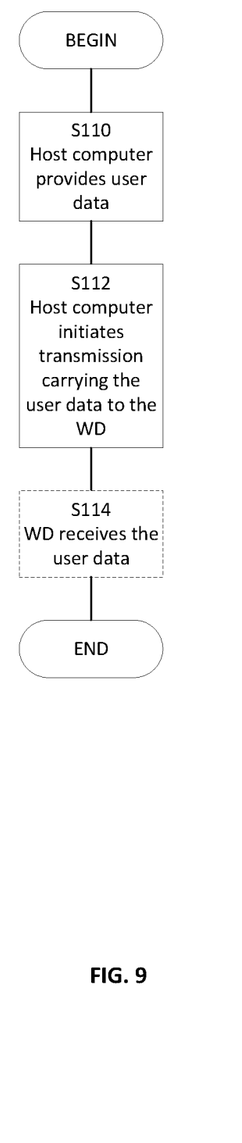

FIG. 9 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figure 10:
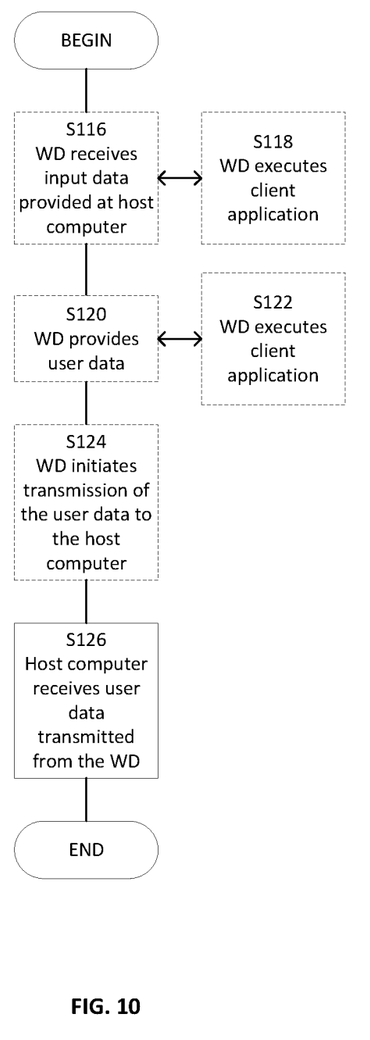

FIG. 10 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

Figure 11:
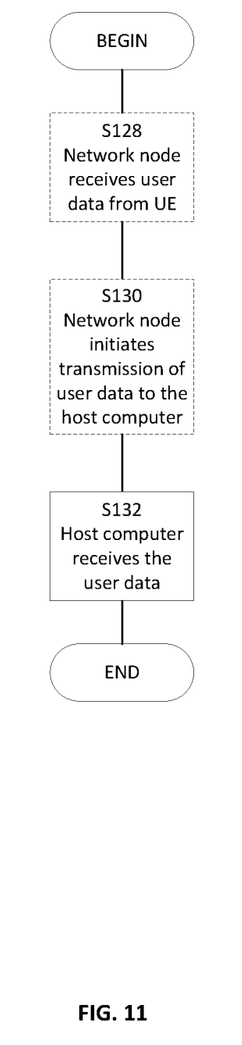

FIG. 11 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 12:
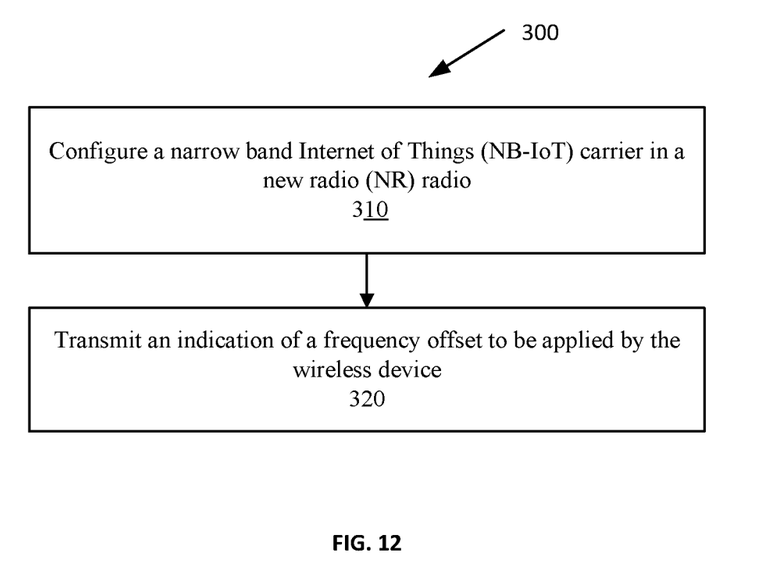
FIG. 12 is a flowchart of an exemplary process in a network node for determining/signalling a frequency offset (e.g. DL-to-UL Frequency Offset) in a NB-IoT TDD Network according to some embodiments of the present disclosure.

FIG. 12 is a flowchart of an exemplary process 300 in a network node 16. In this process, the network node 16 configures a narrow-band-Internet of things (NB-IoT) carrier in a new radio (NR) carrier, in step 310. In step 320, the network node transmits an indication of a frequency offset to be applied by the wireless device.

In some embodiments, the indication comprises an absolute carrier frequency. For example, the absolute carrier frequency may comprise one of an E-UTRA Absolute Radio Frequency Channel Number (EARFCN), NR Absolute Radio Frequency Channel Number (NR-ARFCN) or Global Synchronization Channel Number (GSCN).

In some embodiments, the network node may reconfigure the wireless device from a first configuration to a second configuration. In such a case, the network node may signal an update of the frequency shift.

In some embodiments, the frequency offset is a downlink to uplink (DL-UL) frequency offset. For example, the frequency offset can be one of 7.5 kHz, −7.5 kHz or 0 kHz.

In some embodiments, the network node may configure the NB-IoT carrier in one of a stand-alone operation mode or a guard-band operation mode.

In some embodiments, the indication is transmitted in one of a system information or a narrow-band master information block (MIB-NB).

Figure 13:
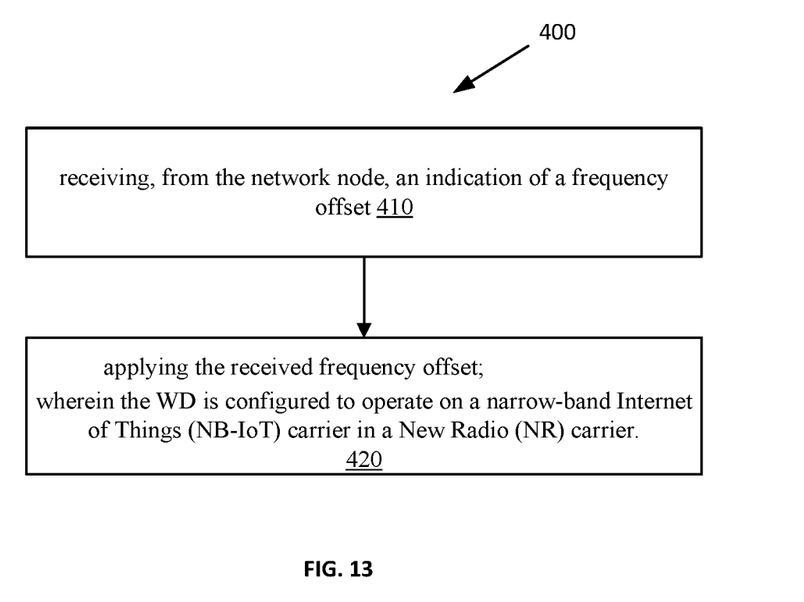
FIG. 13 is a flowchart of an exemplary process in a wireless device for determining/receiving a frequency offset (e.g. DL-to-UL Frequency Offset) in a NB-IoT TDD Network according to some embodiments of the present disclosure.

FIG. 13 is a flowchart of an exemplary process 400 in a wireless device 22 according to some embodiments of the present disclosure. The method 400 includes:

In step 410: receiving, from the network node, an indication of a frequency offset (or shift);

In step 420: applying the received frequency offset, wherein the WD is configured to operate on a narrow-band Internet of Things (NB-IoT) carrier in a New Radio (NR) carrier.

In some embodiments, the indication may comprise an absolute carrier frequency. For example, the absolute carrier frequency may comprise one of an E-UTRA Absolute Radio Frequency Channel Number (EARFCN), NR Absolute Radio Frequency Channel Number (NR-ARFCN) or Global Synchronization Channel Number (GSCN).

In some embodiments, the method 400 may further receive a signal for reconfiguring the wireless device from a first configuration to a second configuration. In that case, the method may further receive a signal of an update of the frequency shift.

In some embodiments, the frequency offset may be a downlink to uplink (DL-UL) frequency offset. For example, the frequency offset may be one of 7.5 kHz, −7.5 kHz and 0 kHz.

In some embodiments, the indication is received in one of a system information or a narrow band-Master Information block (MIB-NB).

Having described some embodiments of the present disclosure, a more detailed description of some of the embodiments is provided below.

According to a first embodiment of the present disclosure, a NB-IoT TDD device can determine the DL-to-UL frequency shift from the raster offset information provided in MIB-NB. Observe in FIG. 2 that, the UL PRB center is 7.5 kHz lower than the DL PRB center when the PRB is above the DC subcarriers, i.e. the subcarrier frequencies in the PRB are higher than that of the DC subcarrier. On the other hand, the UL PRB center is 7.5 kHz higher than the DL PRB center when the PRB is below the DC subcarriers, i.e. the subcarrier frequencies in the PRB are lower than that of the DC subcarrier. Thus, whether the DL-to-UL frequency shift is 7.5 kHz or −7.5 kHz depends on whether the NB-IoT PRB is below or above the DC subcarrier.

For LTE carrier bandwidth of 10 or 20 MHz, the raster offset is −2.5 kHz if the NB-IoT anchor is above the DC subcarrier, and 2.5 kHz if the NB-IoT anchor is below the DC subcarrier. For LTE carrier bandwidth of 3, 5, and 15 MHz, the raster offset is 7.5 kHz if the NB-IoT anchor is above the DC subcarrier, and −7.5 kHz if the NB-IoT anchor is below the DC subcarrier. Thus, if the device from MIB-NB learns that the raster offset is 2.5 kHz or −7.5 kHz, it can infer that the NB-IoT PRB is below the DC subcarrier. And in this case, it should shift the DL PRB center up by 7.5 kHz to obtain the PRB center for the uplink transmissions. Or if the device from MIB-NB learns that the raster offset is −2.5 kHz or 7.5 kHz, it can infer that the NB-IoT PRB is above the DC subcarrier. And in this case, it should shift the DL PRB center down by 7.5 kHz to obtain the PRB center for the uplink transmissions.

In NB-IoT it is also agreed to support sending Narrow band Physical Random Access Channel (NPRACH) on a non-anchor carrier in Radio Resource Control idle mode (RRC) idle mode, or redirect a UE to a non-anchor carrier for load balancing in RRC_connected mode. The position of the UL non-anchor experiences the same problem as the anchor carrier. However, the relationship of the non-anchor carrier with respect to the DC carrier (whether above or below) cannot be derived from the MIB-NB. Therefore, it is proposed to signal whether the position of the non-anchor carrier is above or below the DC carrier, or, for the non-anchor carrier, to signal explicitly whether a 7.5 kHz or a −7.5 kHz shift is applied. It is also possible to signal the PRB index of the non-anchor carrier for the in-band case, then in this case, the UE can derive the 7.5 kHz or a −7.5 kHz shift according to the PRB index.

In a second embodiment, a method for supporting NB-IoT TDD deployed in an NR carrier is provided. In this case, the NB-IoT carrier is configured to operate in one of the stand-alone and guard-band modes with the DL-to-UL frequency shift being 0 kHz as NR doesn't have DC subcarrier. According to this embodiment, MIB-NB (or any other system information message) further optionally includes the frequency raster offset that is configured when a NB-IoT carrier is operating within an NR carrier. Note that in Rel-13 NB-IoT FDD, raster offset is provided only for in-band and guard-band operation mode.

In a third embodiment, a device via MIB-NB learns that the operation mode for the NB-IoT TDD carrier is stand-alone. The MIB-NB, or any other system information message, signals to the UE that there is a non-zero raster offset. From this signaling the UE may infer that the NB-IoT TDD carrier is deployed inside an NR carrier, and therefore it shall not apply any DL-to-UL frequency offset, i.e. the PRB centers for DL and UL are identical.

In a fourth embodiment, a method for supporting NB-IoT TDD deployed in an NR carrier is provided. In this case the NB-IoT carrier is configured as the guard-band operation mode. Here, it is assumed that Release 15 LTE guard-band mode is specified with a DL-to-UL shift of ±7.5 kHz, and that the raster offset information is provided in MIB-NB. However, in this case the device shall not apply any DL-to-UL shift as described in embodiment 2. To resolve this ambiguity, a special flag is introduced in SIB2 or in any other system information blocks (or types) to inform the device whether the DL-to-UL frequency shift needs to be applied (±7.5 kHz) or not (i.e., 0 Hz). This flag allows the UE to know whether the NB-IoT TDD carrier is deployed inside an LTE or an NR carrier. Note: the term "guard-band operation mode" is according to the existing definition of NB-IoT, so this implies that the UE will see the raster offset signaled in MIB-NB and the UE can expect that there are no resource elements occupied by LTE physical signals and channels. This should not be confused as NB-IoT deployed inside an NR carrier using the guard band of the NR carrier. In most cases, NB-IoT will be deployed inside an NR carrier using one of the NR PRBs. So, this is an "NR in-band" deployment. But, "NR in-band" deployed is not defined in 3GPP and the UE does not understand that. However, the UE does not need to know the relationship to the NR carrier. It only needs to know whether there is a raster offset, whether there are some reserved resources, and DL-to-UL frequency shift according to the previous embodiments.

In a fifth embodiment, a method to explicitly signal the absolute carrier frequency used by the UL of an NB-IoT UE in the system information is provided. This applies both for anchor and non-anchor carrier. The absolute carrier frequency can be derived from, e.g., E-UTRA Absolute Radio Frequency Channel Number (EARFCN) in LTE, or similar parameters, in NR, e.g., NR Absolute Radio Frequency Channel Number (NR-ARFCN) or Global Synchronization Channel Number (GSCN).

In a sixth embodiment, it is proposed that the DL-to-UL frequency shift is explicitly signaled to the UE, and the DL-to-UL frequency shift is either −7.5 kHz, 0 Hz, or 7.5 kHz.

In a seventh embodiment, the network (e.g. a network node) reconfigures NB-IoT TDD from a first configuration to a second configuration by providing signaling to update one or more of the information below.
 NB-IoT operation mode (standalone, in-band, or guard-band)
 DL-to-UL frequency shift
 Raster offset
 Uplink EARFCN For example, the first configuration may be for operating NB-IoT TDD as the in-band mode inside an LTE carrier using a PRB above the DC subcarrier, and second configuration may be for operating NB-IoT TDD as the guard-band mode inside an NR carrier.

In some embodiments, configuring a radio node, in particular a terminal or user equipment or the WD 22, may refer to the radio node being adapted or caused or set and/or instructed to operate according to the configuration. Configuring may be done by another device, e.g., a network node 16 (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node 16. A network node 16 may use, and/or be adapted to use, its circuitry/ies for configuring. Allocation information may be considered a form of configuration data. Configuration data may comprise and/or be represented by configuration information, and/or one or more corresponding indications and/or message/s.

Generally, in some embodiments, configuring may include determining configuration data representing the configuration and providing, e.g. transmitting, it to one or more other nodes (parallel and/or sequentially), which may transmit it further to the radio node (or another node, which may be repeated until it reaches the wireless device 22). Alternatively, or additionally, configuring a radio node, e.g., by a network node 16 or other device, may include receiving configuration data and/or data pertaining to configuration data, e.g., from another node like a network node 16, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD 22) may comprise scheduling downlink and/or uplink transmissions for the terminal, e.g. downlink data and/or downlink control signaling and/or Downlink Control Information (DCI) and/or uplink control or data or communication signaling, in particular acknowledgement signaling, and/or configuring resources and/or a resource pool therefor. In particular, configuring a terminal (e.g. WD 22) may comprise configuring the WD 22 to perform certain measurements on certain subframes or radio resources and reporting such measurements according to embodiments of the present disclosure.

In some embodiments, signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

In some embodiments, communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel Data signaling may be signaling associated to and/or on a data channel.

In some embodiments, an indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings.

It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A network node configured to communicate with a wireless device (WD) operating in Time Division Duplex (TDD), the network node comprising a radio interface and processing circuitry, which has a memory and a processor connected thereto, the processor configured to:
   configure a narrow band-Internet of things (NB-IoT) carrier in a new radio (NR) carrier;
   transmit a first indication of a downlink (DL) to uplink (UL) frequency offset to be applied by the wireless device, the DL to UL frequency offset indicating a difference between a first Physical Resource Block (PRB) center and a second PRB center, the first PRB being used for a UL transmission and the second PRB being used for a DL transmission, wherein the indication comprises a value selected from {−7.5 kHz, 0 kHz and 7.5 kHz}.

2. The network node of claim 1, further comprising transmitting a second indication, the second indication comprising an absolute carrier frequency.

3. The network node of claim 2, wherein the absolute carrier frequency comprises one of an E-UTRA Absolute Radio Frequency Channel Number (EARFCN), NR Absolute Radio Frequency Channel Number (NR-ARFCN) and Global Synchronization Channel Number (GSCN).

4. The network node of claim 1, wherein the processor is configured to reconfigure the wireless device from a first configuration to a second configuration.

5. The network node of claim 4, wherein the processor is configured to signal an update of the DL to UL frequency offset.

6. The network node of claim 1, wherein the processor is configured to configure the NB-IoT carrier in one of a stand-alone operation mode and a guard-band operation mode.

7. The network node of claim 1, wherein transmitting the first indication comprises transmitting the first indication in one of a system information and a narrow-band master information block (MIB-NB).

8. A method implemented in a wireless device (WD) operating in Time Division Duplex (TDD), the method comprising:
   receiving, from the network node, a first indication of a downlink (DL) to uplink (UL) frequency offset, the first indication comprising a value selected from {−7.5 kHz, 0 kHz and 7.5 kHz}, the DL to UL frequency offset indicating a difference between a first Physical Resource Block (PRB) center and a second PRB center, the first PRB being used for a UL transmission and the second PRB being used for a DL transmission; and
   applying the received DL to UL frequency offset;
   wherein the WD is configured to operate on a narrowband Internet of Things (NB-IoT) carrier in a New Radio (NR) carrier.

9. The method of claim 8, further comprising receiving a second indication, the second indication comprising an absolute carrier frequency.

10. The method of claim 9, wherein the absolute carrier frequency comprises one of an E-UTRA Absolute Radio Frequency Channel Number (EARFCN), NR Absolute Radio Frequency Channel Number (NR-ARFCN) and Global Synchronization Channel Number (GSCN).

11. The method of claim 8, further comprising receiving a signal for reconfiguring the wireless device from a first configuration to a second configuration.

12. The method of claim 11, further comprising receiving a signal of an update of the DL to UL frequency offset.

13. A wireless device (WD), operating in Time Division Duplex (TDD), comprising a radio interface and processing circuitry, which has a memory and a processor connected thereto, the processor configured to:
   receive, from the network node, a first indication of a downlink (DL) to Uplink (UL) frequency offset, the first indication comprising a value selected from {−7.5 kHz, 0 kHz and 7.5 kHz}, the DL to UL frequency offset indicating a difference between a first Physical Resource Block (PRB) center and a second PRB center, the first PRB being used for a UL transmission and the second PRB being used for a DL transmission; and
   apply the received DL to UL frequency offset;
   wherein the WD is configured to operate on a narrowband Internet of Things (NB-IoT) carrier in a New Radio (NR) carrier.

14. The wireless device of claim 13, wherein the processor is configured to receive a second indication, the second indication comprising an absolute carrier frequency.

15. The wireless device of claim 14, wherein the absolute carrier frequency comprises one of an E-UTRA Absolute Radio Frequency Channel Number (EARFCN), NR Absolute Radio Frequency Channel Number (NR-ARFCN) and Global Synchronization Channel Number (GSCN).

16. The wireless device of claim 13, wherein the processor is configured to receive a signal for reconfiguring the wireless device from a first configuration to a second configuration.

17. The wireless device of claim 16, wherein the processor is configured to receive a signal of an update of the DL to UL frequency offset.

18. The wireless device of claim 13, wherein the processor is configured to receive one of a system information and a narrow band-Master Information block (MIB-NB) containing the indication.

* * * * *